May 29, 1934.   B. H. FREEDMAN   1,960,669
COLOR GUIDE FOR COSMETICS
Filed Feb. 9, 1934
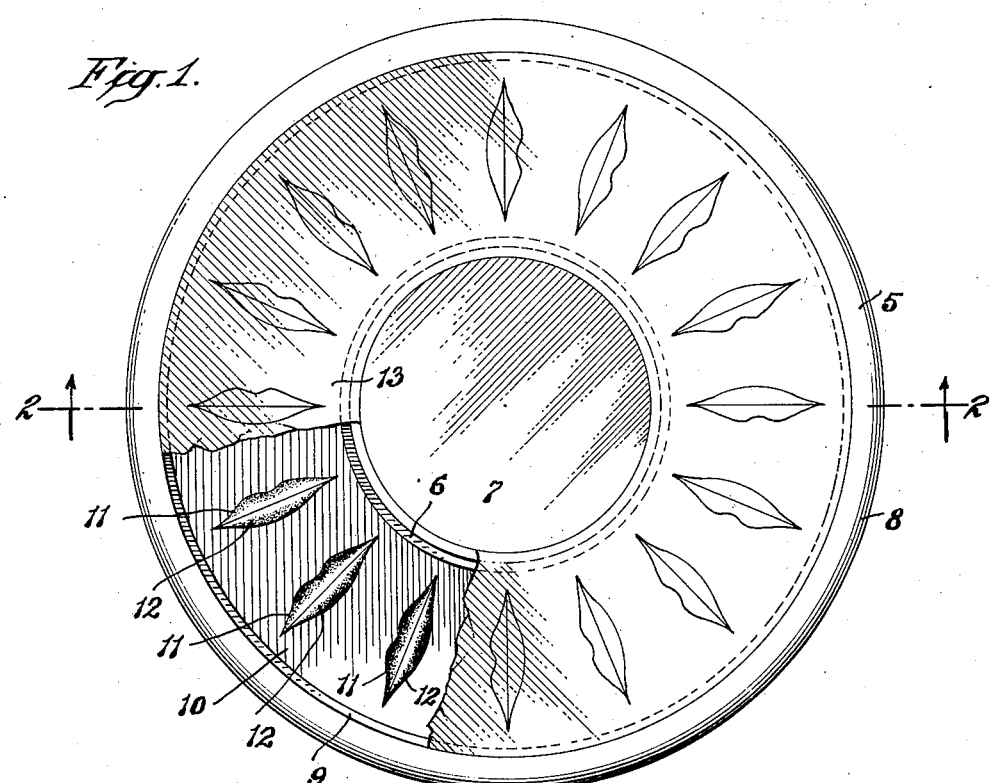
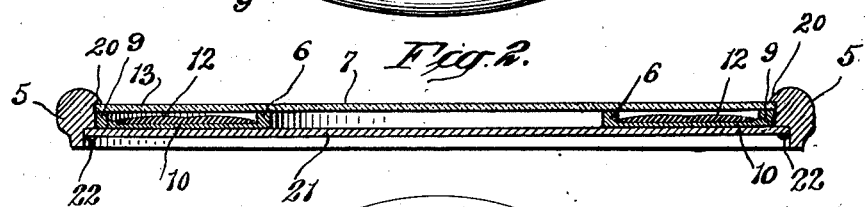
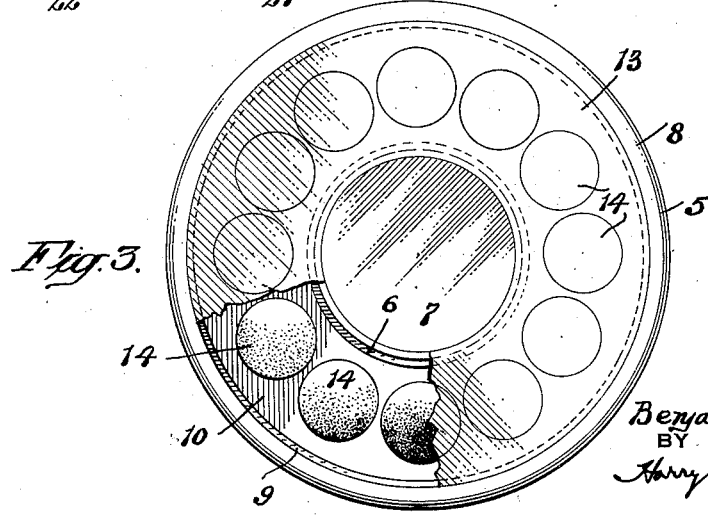
INVENTOR
Benjamin H. Freedman
BY
Harry Radzinsky
ATTORNEY Patented May 29, 1934

1,960,669

UNITED STATES PATENT OFFICE 1,960,669

COLOR GUIDE FOR COSMETICS

Benjamin H. Freedman, New York, N. Y.

Application February 9, 1934, Serial No. 710,395

3 Claims. (Cl. 35—17)

This invention relates to a device intended for use where cosmetics, such as lipsticks, rouges and similar materials are sold, and the object of the invention is to provide a means by which a customer can conveniently determine the color of the cosmetic particularly adapted for her complexion shade.

With this object in view, I have devised an article in the form of a tray-shaped member having a centrally located mirror surrounded by an annular-shaped member or plate having depressions in which specimens of cosmetics of different shades or colors are contained. The location of the numerous specimens of cosmetic, with respect to the mirror, is such that the purchaser viewing her face in the mirror can readily decide which of the various samples of cosmetic contained on the annular plate are most suitable for her particular complexion and can then purchase the cosmetic so determined upon. With an article of this character, error in the selection of the cosmetics is avoided and the purchaser is resultantly satisfied with the shade of cosmetic purchased.

In the accompanying drawing, wherein several embodiments of the invention are shown, Fig. 1 is a plan view of the improved color guide for cosmetics with a part of the cover glass broken away; Fig. 2 is a sectional view on the line 2—2 of Fig. 1, looking in the direction of the arrows; and Fig. 3 is a plan view of a modified arrangement with parts broken away to disclose details of construction.

In the structure shown in Figs. 1 and 2, 5 indicates the frame of the device which is in the form of an annular rim molded from plastic material, or made of metal, or of any other suitable composition.

Held in the frame 5 is a glass which has its central portion 7 silvered to form a mirror. The glass is thus provided with a central disk-shaped mirror portion 7 and a surrounding transparent annular part 13. Located within the frame 5 is an annular tray 10, the edges of which are provided with upstanding walls 6 and 9, the outer wall 9 acting in co-operation with the shoulder 20 on the frame 5 to hold the glass in position in the frame 5.

The annular tray 10 is provided with a plurality of spaced, radially extending depressions 11 which, as shown in Figs. 1 and 2 are shaped to correspond in outline and formation to a pair of lips. Within these depressions is held lipstick material 12 so that each of the numerous depressions 11 provided in the annular member 10 contains a sample of lipstick material of different coloring or shading from its neighbor, which sample is in the shape of a pair of lips. The tray 10 and its contained lipstick material specimens 12 are covered by the protective, transparent, annular portion 13 of the glass material and the lipstick specimens are plainly visible therethrough while the central portion of the glass is used as a mirror.

The frame 5, the glass and the tray 10 are held in their assembled relationship by means of a disk or plate 21 secured in back of the tray 10 by screws 22 entering the frame 5. By removing the plate, the entire device is easily disassembled so that the lipstick specimens can be conveniently changed or a broken cover glass easily replaced when necessary.

From the foregoing, the manner in which the device is used will be readily understood. The user holding the tray before her by grasping the rounded edge 8 of the frame 5, or looking down on it while it rests on the table or other support, can see her image in the central mirror portion 7. At the same time she can successively glance at the lipstick specimens 12 while rotating the device slowly and by comparison of each one of the specimens with her image, may select that which is most suitable for her complexion. The device, therefore, enables a quick comparison of lipstick specimens with one's complexion to be made and a suitable cosmetic or lipstick thus easily selected.

In the structure shown in Fig. 3, the annular tray 10 contains discs 14 of rouge or other cosmetic, the primary difference between this structure and that shown in Figs. 1 and 2, being merely in the shape of the specimens of cosmetic contained on the annular tray 10.

In herein using the word "cosmetic", I wish it to be understood to mean lipstick material, rouges, various face powders, or any other materials and preparations of different shades and colors used on the face.

What I claim is:

1. A device of the character described comprising a tray provided with an annular insert, said insert having a plurality of depressions in the outline of lips, each of said depressions containing lipstick material of a coloring different from that held in the other depressions, a mirror on the tray located in the center of the annular insert to permit the holder of the tray to view her image in the mirror and at the same time determine the fitness of one or another of the several lipstick materials as applied to her own lips.

2. A device of the character described comprising a tray shaped member having a centrally located mirror, an annular support surrounding said mirror, and specimens of cosmetics held by said support so that a person looking in the mirror may at the same time study the effect of one or another of the cosmetics with respect to her particular complexion shade.

3. A device of the character described comprising, an annular ring, a glass held therein, said glass being formed with a centrally located mirror portion and an annular transparent portion, an annular tray held within the ring and behind the transparent portion of the glass, recesses formed in the face of the annular tray, and cosmetics held in the recesses.

BENJAMIN H. FREEDMAN.